Sept. 28, 1948.  R. L. BROSEMER  2,450,111
OVEN FEEDING MACHINE

Filed Dec. 11, 1946  4 Sheets-Sheet 1

INVENTOR
R. L. Brosemer
BY
ATTORNEYS

Sept. 28, 1948. R. L. BROSEMER 2,450,111
OVEN FEEDING MACHINE
Filed Dec. 11, 1946 4 Sheets-Sheet 4

INVENTOR.
R. L. Brosemer
BY
ATTYS

Patented Sept. 28, 1948

2,450,111

UNITED STATES PATENT OFFICE 2,450,111

OVEN FEEDING MACHINE

Robert L. Brosemer, Sacramento, Calif.

Application December 11, 1946, Serial No. 715,383

12 Claims. (Cl. 107—57)

1

This invention is directed to, and it is an object to provide, a power driven machine operative to feed loaded baking pans into a commercial bake oven of the continuous baking type in automatically timed relation to travel of the constant motion, endless pan supporting conveyor which an oven of this type contains.

Another object of the invention is to provide an oven feeding machine which is arranged so that it functions properly even though the speed of the oven conveyor may be varied to change the baking or transit time of the product through the oven.

A further object of the invention is to provide an oven feeding machine for the purpose described which includes a novel arrangement to control the operation of such machine in timed relation with the movement of the oven conveyor so that even though said conveyor is in continuous operation, the machine recurringly starts and stops, with a dwell or at-rest period between its movements sufficient to allow the workman to load the table of the machine with a full complement of bread baking pans. At the same time the pan feeding cycles of the machine are automatically timed to synchronize with the movement and arrival of each successive conveyor tray of the oven at the feeding point.

An additional object of the invention is to provide an oven feeding machine which includes a baking pan supporting table alined with the oven door; said table being of longitudinal slotted construction, and a reciprocating feed mechanism operative from beneath the table; said mechanism having a plurality of pan advancing or pushing fingers projecting through corresponding slots on a forward stroke, and lowered below the table on a retracting stroke whereby the table is then unobstructed for reception of following pans.

It is also an object of this invention to provide an oven feeding machine, which includes novel actuating means for positively and mechanically operating the reciprocating feed mechanism.

A further object of the invention is to provide a simple and relatively inexpensive device, and yet one which will be exceedingly effective for the purpose for which it is designed.

These objects are accomplished by means of such structure and relative arrangement of parts as will fully appear by a perusal of the following specification and claims.

In the drawings:

Fig. 8 is a diagram of the timing or control circuit.

Figure 1:
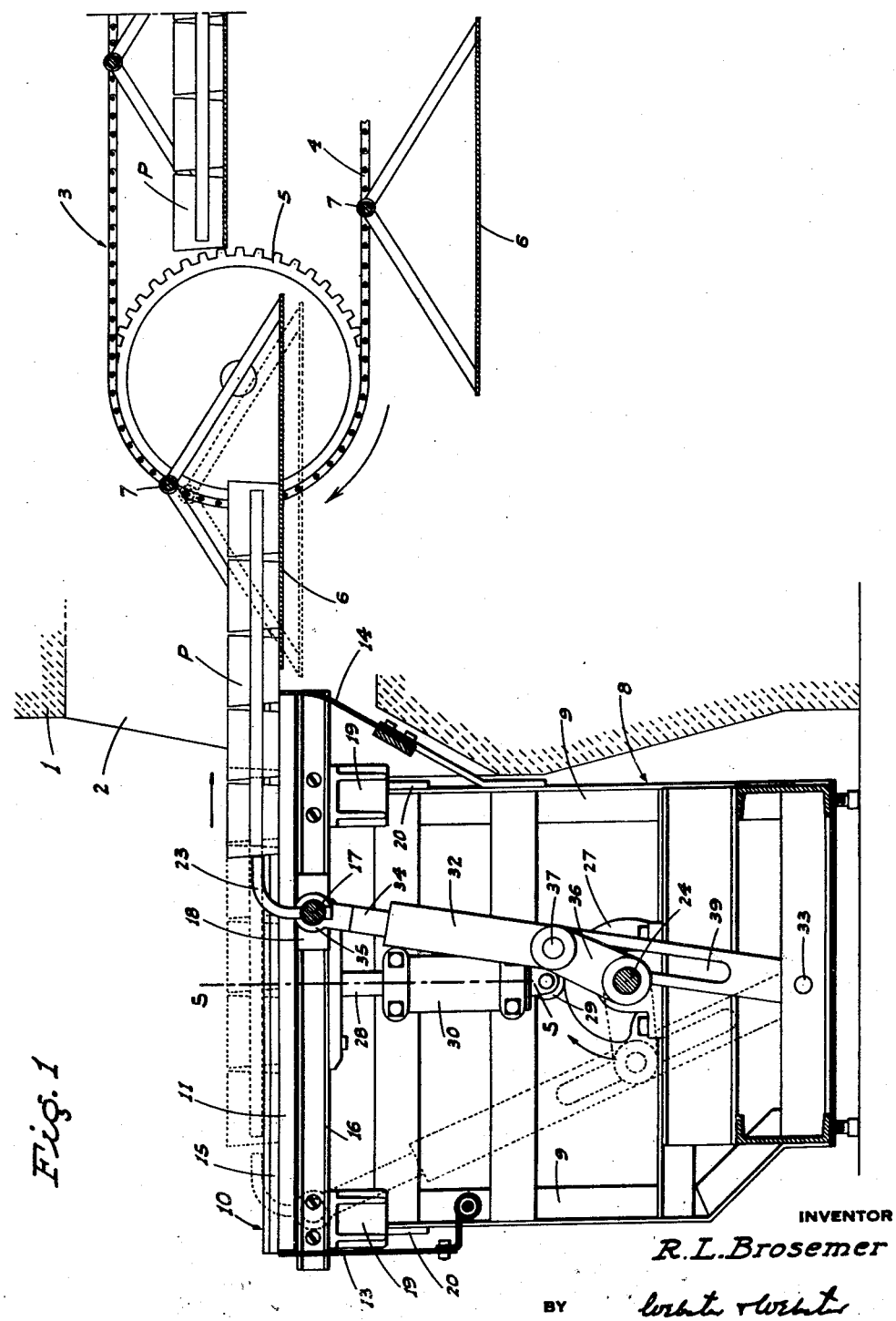
Fig. 1 is a longitudinal sectional elevation of an oven feeding machine with the reciprocating feed mechanism as raised and in pan advancing position.

Referring now more particularly to the characters of reference on the drawings, the oven feeding machine is adapted for use in connection with a commercial baking oven, as used for bread baking or the like, which includes an oven 1 having a horizontal oven opening or door 2 disposed some distance above the floor. Within the oven 1 it includes an endless conveyor, indicated generally at 3, which conveyor comprises a pair of transversely spaced, horizontal endless chains 4 carried by sprockets 5 at opposite ends; there being open-ended pan supporting trays 6 suspended from cross rods 7 which extend between said chains in a manner so that the trays 6 remain horizontal at all times. The conveyor 3 travels in a direction so that the trays 6 are moving upwardly as they reach the end of the conveyor adjacent the oven door 2.

The machine which is the subject of the present invention is arranged to automatically feed loaded bread pan units P onto the trays 6 as they pass the door 2. Such machine comprises the following:

The oven feeding machine is disposed outwardly of the oven in advance of, and in vertical alinement with, the oven door 2, such machine including an open, upstanding frame, indicated generally at 8, which frame includes corner posts 9.

At the top the frame 8 supports a horizontal pan receiving or supporting table 10 comprised of a multiplicity of longitudinally extending, transversely spaced bars 11, whereby said table 10 is in effect of longitudinally slotted configuration, the slots being indicated at 12. The bars 11 are supported, at their rear ends, by an upstanding plate 13, while the forward ends of said bars are supported by transversely spaced upstanding fingers 14. At the sides of the table 10 there are pan locating stops 15; the loaded bread pan units P being delivered to the table 10, between said stops, successively, and with a predetermined interval of time therebetween, by hand or any suitable conveying assembly (not shown).

The bread pan units P as received on the table 10 are fed therefrom into the oven by means of the following described reciprocating feed mechanism:

Beneath the slotted, pan supporting table 10 the machine includes, adjacent opposite ends thereof, a pair of horizontal, longitudinally extending guide rails 16 of laterally inwardly facing channel configuration, and said guide rails 16 are connected by a cross bar 17, fitted at the ends with slide blocks 18 which run in said channel-shaped rails 16, whereby the cross bar 17 may be advanced and retracted relative to the oven door 2.

The guide rails 16 are mounted for vertical movement or reciprocation by means of guides 19, of generally L-shape in plan, which are fixed in connection with adjacent end portions of the guide rails 16, and run against vertical bearing plates 20 on corresponding corner posts 9 of the frame. The guides 19 are fixed in connection with the guide rails 16 by cooperatively notching the same, as at 21, and connecting by machine screws 22.

The cross bar 17 is non-turnable and carries a plurality of upwardly and forwardly curved pusher fingers 23 positioned to engage through the slots 12. When the guide rails 16 are in raised position, as in Fig. 1, the fingers 23 project above the pan supporting table 10 for working engagement with one end of a bread pan unit P, whereas when said guide rails 16 are in a lowered position, as in Fig. 2, the pusher fingers 23 are disposed below said table 10 for free retracting movement.

The assembly of the guide rails 16, cross bar 17, and the pusher fingers 23 is recurringly raised up and down, i. e. vertically reciprocated, by the following arrangement:

A horizontal cross shaft 24 extends through, and is supported by, the frame 8 some distance below the table 10, said cross shaft being adapted to be driven by means of an electric motor 25 coupled to said shaft by a reduction gear unit 26.

Adjacent opposite ends the horizontal cross shaft 24 carries rotary cams 27, and vertical plungers 28 having rollers 29 on their lower ends cooperatively engage said cams 27. The plungers 28 run through guide sleeves 30 fixed in the frame, and at their upper ends the plungers are attached to corresponding ones of the guide rails 16. A compression spring 31 cooperates with each plunger 29 and urges the same downwardly toward and into constant engagement with the corresponding cam 27. The cams 27 are of matching configuration and are formed so that with each revolution of the horizontal cross shaft 24 said cams will act to raise the pusher fingers 23, maintain them in such raised position for a certain time, and then permit the same to retract under the action of the springs 31. This sequence of motion of the pusher fingers 23 bears predetermined timed relation to actuation of the remainder of such machine, as will hereinafter appear.

The assembly of the slide blocks 18, cross bar 17, and the pusher fingers 23, is reciprocated back and forth, i. e. advanced and retracted in successive and recurring order, by means of a pair of upstanding swing arm units 32 mounted in the frame and pivoted at their lower ends, as at 33, for swinging movement in a longitudinal vertical plane. The swing arm units 32 are telescopic and each includes an upper section 34 which is mounted for relative vertical sliding motion. The upper sections 34 are turnably connected, as at 35, with the cross bar 17, whereby upon to and fro swinging of the units 32, said cross bar 17, together with the pusher fingers 23, are reciprocated, as desired.

Such swinging of the swing arm units 32 is accomplished by corresponding cranks 36 on the driven cross shaft 24, and said cranks 36 include crank pins 37 carried in slide blocks 38 which run in longitudinal slots 39 in said arm units 32. Thus, as the shaft 24 and cranks 36 rotate in the direction indicated, the arm units 32 swing back and forth in a longitudinal vertical plane to advance and retract the pusher fingers 23. The cams 27 are disposed relative to the cranks 36 so that at the beginning of each forward or advancing stroke of the arm units 32 the guide rails 16 are raised, projecting the pusher fingers 23 above the table 10 for pan engagement, as shown in Fig. 1.

Figure 2:
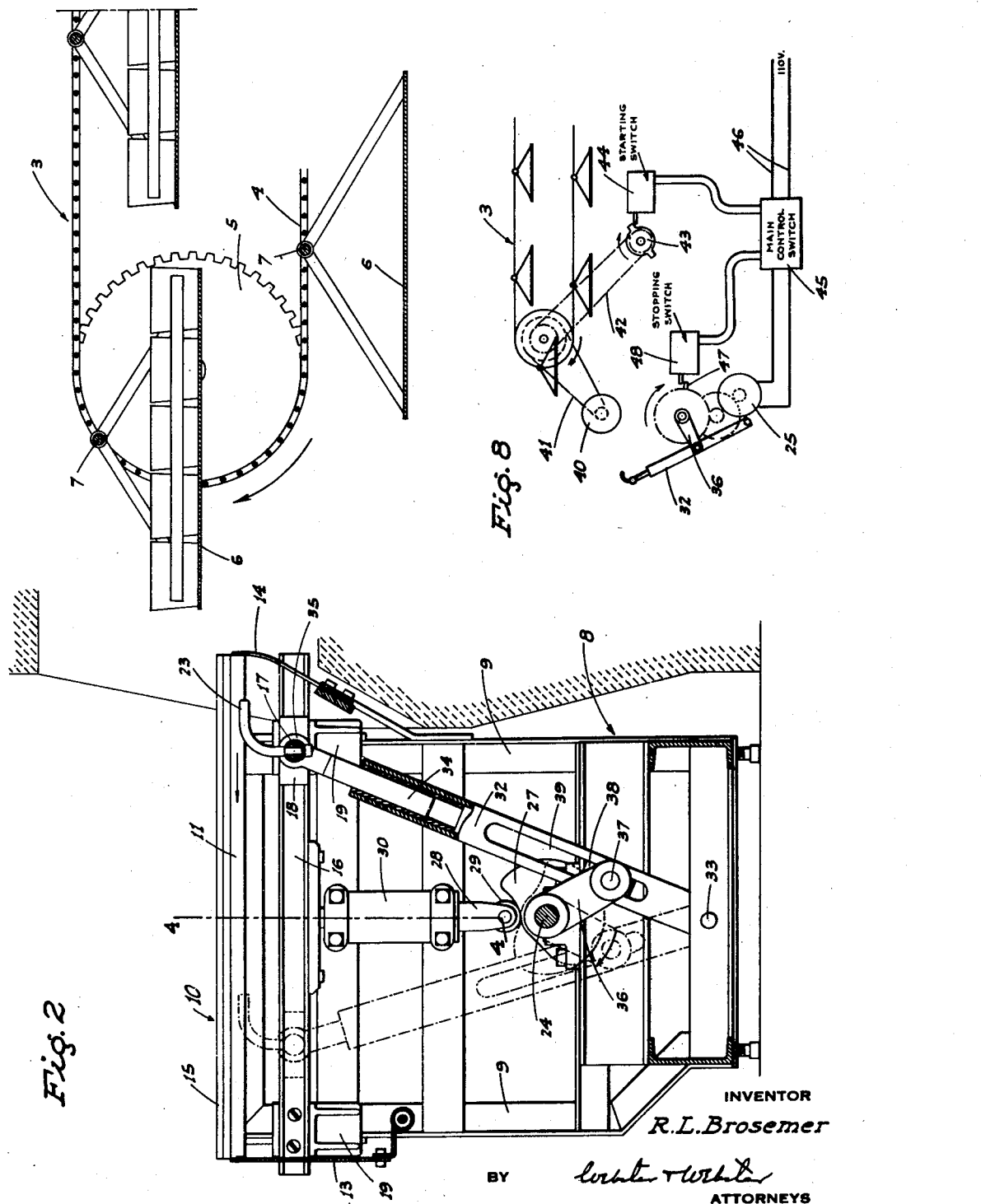
Fig. 2 is a similar view, but shows the reciprocating feed mechanism as lowered and in retracted position.
Figure 3:
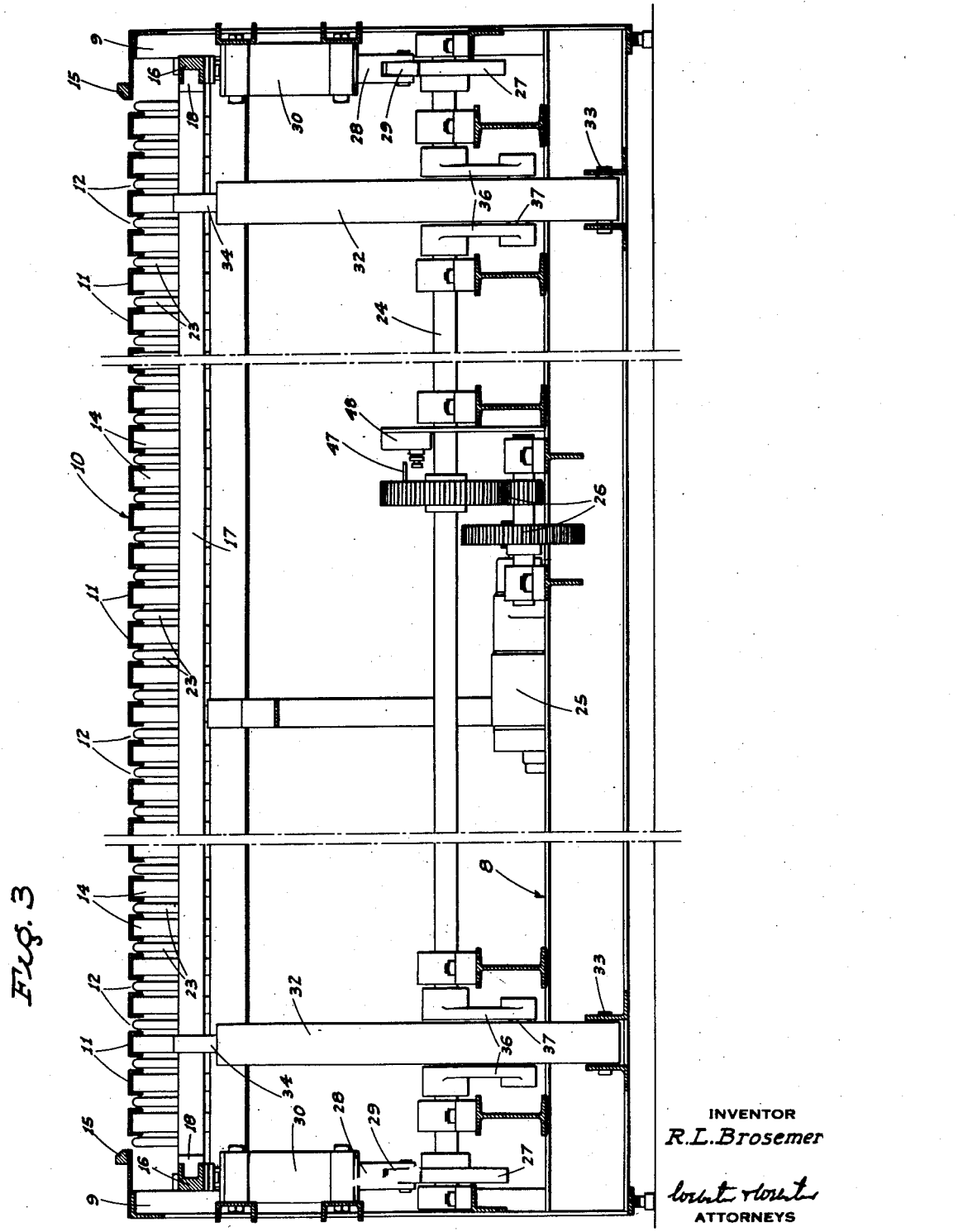
Fig. 3 is a cross sectional elevation of the machine.
Figure 4:
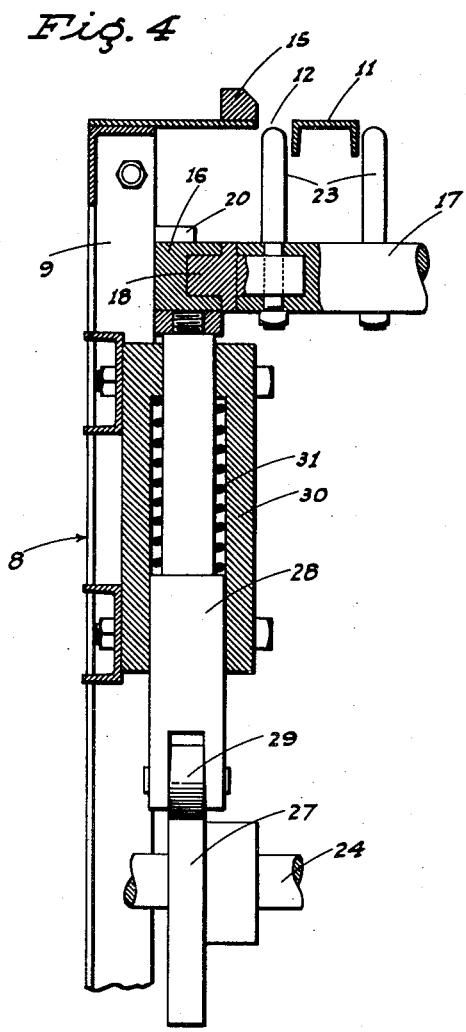
Fig. 4 is an enlarged fragmentary cross section on line 4—4 of Fig. 2.
Figure 5:
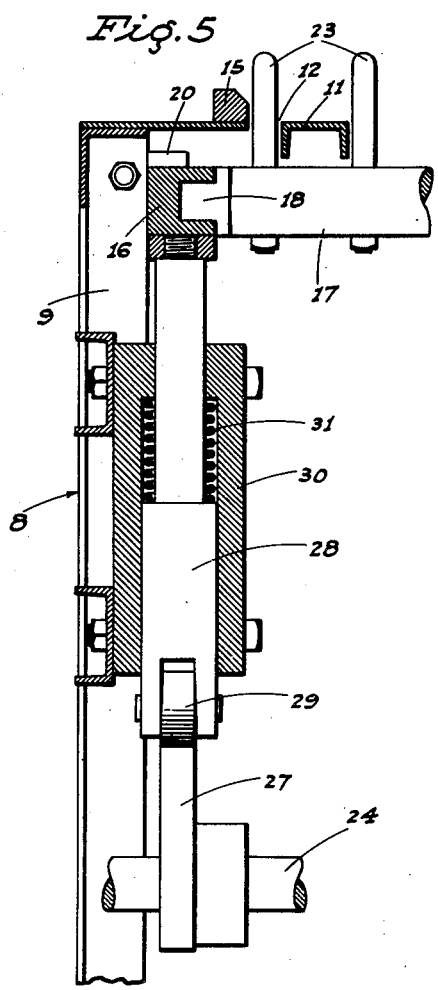
Fig. 5 is an enlarged fragmentary cross section on line 5—5 of Fig. 1.
Figure 6:
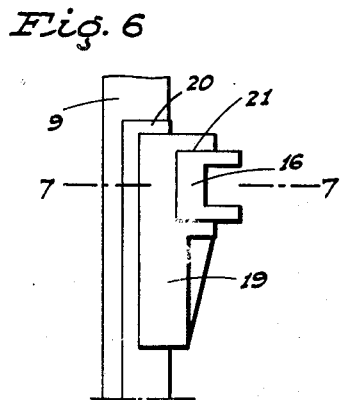
Fig. 6 is an enlarged fragmentary elevation illustrating the manner of mounting each end of the guide rails for vertical movement of the latter.
Figure 7:
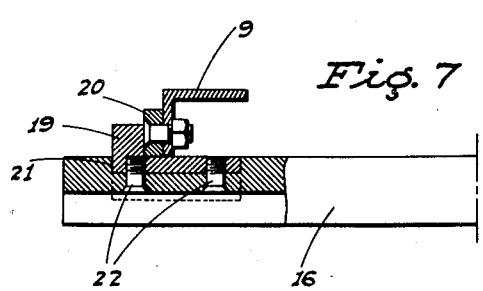
Fig. 7 is a cross sectional plan on line 7—7 of Fig. 6.

The guide rails 16 remain raised until the arm units 32 reach the forward limit of their movement, whereupon the guide rails 16 are dropped by the cams so that such fingers, upon the retracting stroke of the arm units 32, are below the table, as shown in Fig. 2.

The oven feeding machine is actuated, through its cycle of movement, to feed loaded bread pan units P from the table 10 onto the trays 6 as each of the latter is presented adjacent the oven door 2; the transfer of pan units P from the table 10 to trays 6 being accomplished without stopping the oven conveyor 3, which is possible for the reason that said conveyor 3 travels relatively slow, whereas the described feeding machine is relatively faster in its action.

When each of the trays 6 reaches its dotted line position of Fig. 1, the oven feeding machine begins a cycle of movement; the pusher fingers 23 advancing supported bread pan units P from table 10 onto said tray while it is traveling slowly.

Starting and stopping of the machine at the proper time is accomplished by means of a control circuit, indicated diagrammatically in Fig. 8, wherein the endless conveyor 3 is shown as being driven at constant but adjustable speed by means of a motor 40 and an endless drive 41. The endless drive 41 is in turn connected in driven relation to an endless timing chain 42 which drives a timing cam or wheel 43. As each tray 6 reaches its loading position adjacent the oven door 2, the timing cam 43 actuates a starting switch 44, which effects closing of the main control switch 45 in the energizing circuit 46 for the motor 25.

When the motor 25 is started, the machine runs through a complete cycle of operation, as described, and when said cycle is completed a finger 47 on the final drive gear of the reduction gear unit 26 operates a stopping switch 48, which causes opening of the main control switch 45, deenergizing the motor 25, From the above, it is obvious that regardless of the adjusted speed of the oven conveyor 3, the oven feeding machine for each cycle of its operation is started at the correct time for feeding of supported pan units into the oven and onto the trays 6, while stopping of the machine, being controlled from the machine drive means, will always occur at the proper time, and after a complete cycle of movement. This is because the finger 7 is on a gear of the reduction gear unit 26 which makes only one full turn during each cycle of operation of the machine, which cycle includes advancing of the pusher fingers 23 in raised position through a forward stroke, and retraction of such pusher fingers in a lowered position through a rearward stroke.

The cranks are so designed and positioned relative to the cranks 36 and the pivot point 33 of swing arms 32, that the forward or feeding speed of the pusher fingers will be slower than the retracting stroke thereof. This provides a fast cycle of movement, without the feeding speed itself being excessive.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. Oven feed mechanism comprising an upstanding frame, a baking pan unit supporting table on the frame, and power driven feed mechanism mounted on the frame arranged to engage a supported pan unit and advance the latter from the table in a predetermined direction; the table being longitudinally slotted, and said mechanism including an upstanding, telescopic swing arm pivotally mounted for swinging motion in a longitudinal vertical plane, power means operative to reciprocate the swing arm, a pusher element, means mounting the pusher element for guided cyclic movement through a path comprising a raised advancing stroke and a lowered retracting stroke, the pusher element projecting through the slotted table for pan unit engagement on the advancing stroke and being disposed under the table on the retracting stroke, and means operatively connecting the pusher element and swing arm so that reciprocation of the latter recurringly advances and retracts the pusher element.

2. Oven feed mechanism comprising an upstanding frame, a baking pan unit supporting table on the frame, the table having a plurality of longitudinal, transversely spaced slots therethrough, a horizontal cross bar beneath the table, means mounting the cross bar for power actuated cyclic movement through a raised advancing stroke and a lowered retracting stroke, and a plurality of pan unit pusher elements upstanding from the cross bar in alinement with the slots in the table, the pusher elements projecting through the slots and above the table for pan unit engagement and advancement during said advancing stroke and being below the table on the retracting stroke.

3. Oven feed mechanism comprising an upstanding frame, a baking pan unit supporting table on the frame, the table having a plurality of longitudinal, transversely spaced slots therethrough, a horizontal cross bar beneath the table, a pair of transversely spaced longitudinal guide rails mounted in the frame for simultaneous and corresponding vertical reciprocation, means mounting the cross bar at the ends on the corresponding guide rails for horizontal reciprocation, power means operative to vertically reciprocate the guide rails and horizontally reciprocate the cross bar in predetermined timed order whereby said cross bar traverses a cyclic path comprising a raised advancing stroke and a lowered retracting stroke, and a plurality of pan unit pusher elements upstanding from the cross bar in alinement with the slots in the table, the pusher elements projecting through the slots and above the table for pan unit engagement and advancement during said advancing stroke and being below the table on the retracting stroke.

4. Oven feed mechanism comprising an upstanding frame, a baking pan unit supporting table on the frame, the table having a plurality of longitudinal, transversely spaced slots therethrough, a horizontal cross bar beneath the table, a pair of transversely spaced longitudinal guide rails, means mounting the guide rails on the frame for guided vertical reciprocation, power actuated means operative to simultaneously and correspondingly reciprocate the guide rails, means mounting the cross bar at the ends on the corresponding guide rails for horizontal reciprocation, other power actuated means operative to horizontally reciprocate the cross bar, both of said power actuated means working in predetermined timed order whereby the cross bar traverses a cyclic path comprising a raised advancing stroke and a lowered retracting stroke, and a plurality of pan unit pusher elements upstanding from the cross bar in alinement with the slots in the table, the pusher elements projecting through the slots and above the table for pan unit engagement and advancement during said advancing stroke and being below the table on the retracting stroke.

5. Oven feed mechanism comprising an upstanding frame, a baking pan unit supporting table on the frame, the table having a plurality of longitudinal, transversely spaced slots therethrough, a horizontal cross bar beneath the table, a pair of transversely spaced longitudinal guide rails, means mounting the guide rails on the frame for guided vertical reciprocation, power actuated means operative to simultaneously and correspondingly reciprocate the guide rails, means mounting the cross bar at the ends on the corresponding guide rails for horizontal reciprocation, other power actuated means operative to horizontally reciprocate the cross bar, both of said power actuated means working in predetermined timed order whereby the cross bar traverses a cyclic path comprising a raised advancing stroke and a lowered retracting stroke, and a plurality of pan unit pusher elements upstanding from the cross bar in alinement with the slots in the table, the pusher elements projecting through the slots and above the table for pan unit engagement and advancement during said advancing stroke and being below the table on the retracting stroke; there being a power driven cross shaft mounted in the frame below the guide rails, said first named power actuated means including vertically movable plungers corresponding to each guide rail and engaged therewith from below, and plunger actuating cams on the cross shaft.

6. Oven feed mechanism comprising an upstanding frame, a baking pan unit supporting table on the frame, the table having a plurality of longitudinal, transversely spaced slots therethrough, a horizontal cross bar beneath the table, a pair of transversely spaced longitudinal guide rails, means mounting the guide rails on the frame for guided vertical reciprocation, power actuated means operative to simultaneously and correspondingly reciprocate the guide rails, means mounting the cross bar at the ends on the corresponding guide rails for horizontal reciprocation, other power actuated means operative to horizontally reciprocate the cross bar, both of said power actuated means working in predetermined timed order whereby the cross bar traverses a cyclic path comprising a raised advancing stroke and a lowered retracting stroke, and a plurality of pan unit pusher elements upstanding from the cross bar in alinement with the slots in the table, the pusher elements projecting through the slots and above the table for pan unit engagement and advancement during said advancing stroke and being below the table on the retracting stroke; there being a power driven cross shaft mounted in the frame below the guide rails, said first named power actuated means including vertically movable plungers corresponding to each guide rail and engaged therewith from below, and plunger actuating cams on the cross shaft, the cams being operative to raise the plungers, and springs being provided to lower the latter.

7. Oven feed mechanism comprising an upstanding frame, a baking pan unit supporting table on the frame, the table having a plurality of longitudinal, transversely spaced slots therethrough, a horizontal cross bar beneath the table, a pair of transversely spaced longitudinal guide rails, means mounting the guide rails on the frame for guided vertical reciprocation, power actuated means operative to simultaneously and correspondingly reciprocate the guide rails, means mounting the cross bar at the ends on the corresponding guide rails for horizontal reciprocation, other power actuated means operative to horizontally reciprocate the cross bar, both of said power actuated means working in predetermined timed order whereby the cross bar traverses a cyclic path comprising a raised advancing stroke and a lowered retracting stroke, and a plurality of pan unit pusher elements upstanding from the cross bar in alinement with the slots in the table, the pusher elements projecting through the slots and above the table for pan unit engagement and advancement during said advancing stroke and being below the table on the retracting stroke; there being a power driven cross shaft mounted in the frame below the guide rails, said last named power actuated means including a transversely spaced pair of upstanding swing arm units pivoted in the frame adjacent their lower ends for swinging motion in a longitudinal vertical plane, such arm units being telescopic and connected at the upper ends to the cross bar, and corresponding cranks on the cross shaft connected to the arm units in a manner to reciprocate the same.

8. Oven feed mechanism comprising an upstanding frame, a baking pan unit supporting table on the frame, the table having a plurality of longitudinal, transversely spaced slots therethrough, a horizontal cross bar beneath the table, a pair of transversely spaced longitudinal guide rails, means mounting the guide rails on the frame for guided vertical reciprocation, power actuated means operative to simultaneously and correspondingly reciprocate the guide rails, means mounting the cross bar at the ends on the corresponding guide rails for horizontal reciprocation, other power actuated means operative to horizontally reciprocate the cross bar, both of said power actuated means working in predetermined timed order whereby the cross bar traverses a cyclic path comprising a raised advancing stroke and a lowered retracting stroke, and a plurality of pan unit pusher elements upstanding from the cross bar in alinement with the slots in the table, the pusher elements projecting through the slots and above the table for pan unit engagement and advancement during said advancing stroke and being below the table on the retracting stroke, there being a power driven cross shaft mounted in the frame below the guide rails, said first named power actuated means including vertically movable plungers corresponding to each guide rail and engaged therewith from below, and plunger actuating cams on the cross shaft, said last named power actuated means including a transversely spaced pair of upstanding swing arm units pivoted in the frame adjacent their lower ends for swinging motion in a longitudinal vertical plane, such arm units being telescopic and connected at the upper ends to the cross bar, and corresponding cranks on the cross shaft connected to the arm units in a manner to reciprocate the same.

9. Oven feed mechanism comprising an upstanding frame, a baking pan unit supporting table on the frame, the table having a plurality of longitudinal, transversely spaced slots therethrough, a horizontal cross bar beneath the table, a pair of transversely spaced longitudinal guide rails mounted in the frame for simultaneous and corresponding vertical reciprocation, means mounting the cross bar at the ends on the corresponding guide rails for horizontal reciprocation, power means operative to vertically reciprocate the guide rails and horizontally reciprocate the cross bar in predetermined timed order whereby said cross bar traverses a cyclic path comprising a raised advancing stroke and a lowered retracting stroke, and a plurality of pan unit pusher elements upstanding from the cross bar in alinement with the slots in the table, the pusher elements projecting through the slots and above the table for pan unit engagement and advancement during said advancing stroke and being below the table on the retracting stroke; the guide rails being of laterally inwardly facing channel shape, and said cross bar mounting means including slide blocks running in said guide rails.

10. Oven feed mechanism comprising an upstanding frame, a baking pan unit supporting table on the frame, the table having a plurality of longitudinal, transversely spaced slots therethrough, a horizontal cross bar beneath the table, a pair of transversely spaced longitudinal guide rails mounted in the frame for simultaneous and corresponding vertical reciprocation, means mounting the cross bar at the ends on the corresponding guide rails for horizontal reciprocation, power means operative to vertically reciprocate the guide rails and horizontally reciprocate the cross bar in predetermined timed order whereby said cross bar traverses a cyclic path comprising a raised advancing stroke and a lowered retracting stroke, and a plurality of pan unit pusher elements upstanding from the cross bar in alinement with the slots in the table, the pusher elements projecting through the slots and above the table for pan unit engagement and advancement during said advancing stroke and being below the table on the retracting stroke; said power means including a power driven cross shaft in the frame, cams on the cross shaft arranged to vertically reciprocate the guide rails, and cranks on the cross shaft arranged to horizontally reciprocate the cross bar.

11. Oven feed mechanism comprising an upstanding frame, a pan unit supporting table on the frame, the table being vertically slotted lengthwise thereof, a plurality of pan unit pusher elements adapted to project from below the table through the slots for engagement with a pan unit on the table, a supporting member below the table, the pusher elements being mounted thereon, said supporting member being mounted for movement in a substantially horizontal plane and power means operative to reciprocate said member and elements through a cyclic path including an advancing stroke and a retracting stroke.

12. A feed mechanism as in claim 11 including power means to vertically raise the supporting member prior to the initiation of its advancing stroke whereby to project the pusher elements through the slots, and other means to vertically lower the supporting member at the end of its advancing stroke to withdraw the pusher elements to a point below the slots.

ROBERT L. BROSEMER.

REFERENCES CITED

The following references are of record in the file of this patent:

UNITED STATES PATENTS

| Number | Name | Date |
| --- | --- | --- |
| 1,604,348 | Harber | Oct. 26, 1926 |
| 1,795,352 | Sundbom | Mar. 10, 1931 |
| 2,363,920 | Young et al. | Nov. 28, 1944 |

FOREIGN PATENTS

| Number | Country | Date |
| --- | --- | --- |
| 20,887 | Great Britain | Sept. 16, 1913 |
| 607,531 | Germany | Dec. 29, 1934 |